United States Patent
Jubb et al.

(10) Patent No.: US 10,465,586 B2
(45) Date of Patent: Nov. 5, 2019

(54) INORGANIC FIBRE MATS

(71) Applicant: Thermal Ceramics UK Limited, Merseyside (GB)

(72) Inventors: Gary Jubb, Merseyside (GB); Farid Modarresifar, Merseyside (GB)

(73) Assignee: Thermal Ceramics UK Limited, Merseyside (GB)

( * ) Notice: Subject to any disclaimer, the term of this patent is extended or adjusted under 35 U.S.C. 154(b) by 0 days.

(21) Appl. No.: 16/388,591

(22) Filed: Apr. 18, 2019

(65) Prior Publication Data

US 2019/0242286 A1    Aug. 8, 2019

(30) Foreign Application Priority Data

Aug. 17, 2018  (GB) .................................. 1813436.1

(51) Int. Cl.
*F01N 3/28* (2006.01)

(52) U.S. Cl.
CPC ........ *F01N 3/2853* (2013.01); *F01N 2310/00* (2013.01)

(58) Field of Classification Search
CPC .... F01N 3/2853; F01N 3/2864; F01N 3/2867; F01N 2310/00
USPC ....................................... 422/179; 428/297.7
See application file for complete search history.

(56) References Cited

U.S. PATENT DOCUMENTS

| | | | |
|---|---|---|---|
| 8,088,701 B2 | 1/2012 | Jubb | |
| 2006/0094583 A1* | 5/2006 | Freeman | C03C 13/00 501/36 |
| 2006/0165968 A1* | 7/2006 | Tanaka | C03C 13/00 428/297.4 |
| 2010/0055457 A1* | 3/2010 | Jubb | C03C 13/00 428/401 |
| 2010/0264352 A1* | 10/2010 | Jubb | C03C 13/00 252/62 |
| 2011/0028606 A1* | 2/2011 | Li | C03C 3/087 524/1 |
| 2012/0171486 A1* | 7/2012 | Kitahara | C03C 13/00 428/401 |
| 2012/0247156 A1* | 10/2012 | Kitahara | C03B 5/26 65/377 |

FOREIGN PATENT DOCUMENTS

WO    2009/066076 A1    5/2009

* cited by examiner

*Primary Examiner* — Tom P Duong
(74) *Attorney, Agent, or Firm* — Servilla Whitney LLC (57) ABSTRACT

A fibre mat, for example a monolith support mat or end cone insulator, the mat comprising inorganic fibres having a pressure retained value at 10 minutes at 900° C. of greater than 20 kPa; and preferably a binder. The inorganic fibres comprise X and Y and $K_2O$, the sum of which is greater than 95 wt. % wherein X is the sum of $SiO_2$ and $ZrO_2$ and Y is the sum of $Al_2O_3$ and $La_2O_3$, wherein $ZrO_2$ and $La_2O_3$ is each present in up to 10 wt. % of the total weight of the inorganic fibres.

23 Claims, 1 Drawing Sheet

INORGANIC FIBRE MATS

CROSS REFERENCE TO RELATED APPLICATION

This application claims priority to Great Britain Patent Application No. 1813436.1, filed Aug. 17, 2018 the disclosure of which is incorporated herein by reference in its entirety.

BACKGROUND

This disclosure relates generally to inorganic fibre mats. More specifically, although not exclusively, this disclosure relates to inorganic fibre mats and uses for the same.

Fibrous materials are well known for their use as thermal and/or acoustic insulating materials and are also known for their use as strengthening constituents in composite materials such as, for example, fibre reinforced cements, fibre reinforced plastics, and as a component of metal matrix composites. Such fibres may be used in support structures for catalyst bodies in pollution control devices such as automotive exhaust system catalytic converters and diesel particulate filters. Such fibres may be used as a constituent of friction materials, e.g. for automotive brakes. The fibres of the present disclosure have a range of properties and may be usable in any or all of these applications depending on the properties shown.

Prior to 1987 there were four principle types of fibrous materials used for making thermal insulation products (such as, for example, blanket, vacuum formed shapes, and mastics). These were made by two principal manufacturing routes, although the details of the particular routes vary according to manufacturer. The fibres and routes were (in order of increasing cost and temperature performance):
Melt formed fibres:
Mineral wools;
Glass wools;
Aluminosilicate fibres.
Sol-gel process fibres:
So-called polycrystalline fibres.
Melt formed fibres are formed by making a melt and fiberising the resultant melt by any one of the many known methods. These methods include:
forming a stream of melt and allowing the stream to contact spinning wheels from which it is flung to form fibres;
forming a stream of melt and allowing the stream to impinge upon a jet of gas that may be transverse, parallel with, or at an angle to the direction of the stream and thereby blasting the melt into fibres;
forming a fibre from the melt by a rotary process in which the melt escapes through apertures in the circumference of a spinning cup and is blasted by hot gases to form fibres;
extruding the melt through fine apertures to form filaments, and in which further treatment may be used (e.g. flame attenuation in which the filament is passed through a flame);
or any other method by which a melt is converted into a fibre.

Because of the history of asbestos fibres, a lot of attention has been paid to the relative potency of a wide range of fibre types as a cause of lung disease. Studies of the toxicology of natural and man-made fibres led to the idea that it was the persistence of fibres in the lung that caused problems. Accordingly, the view developed that if fibres can be removed from the lung quickly, then any risk to health would be minimised. The concepts of "biopersistent fibres" and "biopersistence" arose—fibres that last for a long time in the animal body are considered biopersistent and the relative time that fibres remain in the animal body is known as biopersistence. Whilst several glass systems were known to be soluble in lung fluids, resulting in low biopersistence, there was a problem in that such glass systems were generally not useful for high temperature applications. A market need was seen for a fibre that could have a low biopersistence combined with a high temperature capability. In 1987 Johns Manville developed such a system based on a calcium magnesium silicate chemistry. Such material not only had a higher temperature capability than traditional glass wools, but also had a higher solubility in body fluids than the aluminosilicate fibres mostly used for high temperature insulation. Such low biopersistent fibres have been developed since, and a range of alkaline earth silicate [AES] fibres are now on the market. These alkaline earth silicate fibres contain low quantities of alumina, as alumina decreases the solubility of such fibres.

U.S. Pat. No. 8,088,701 claims potassium aluminosilicate fibres covering a broad range of compositions ($Al_2O_3 \geq 5$ mol %; $K_2O$ 12-40 mol %; and $SiO_2$ 5-80 mol %) and corresponding properties. This document teaches the following: (i) to obtain fine fibres (<10 μm diameter), the silica content should be less than 40 wt. % or viscosity modifiers need to be added; (ii) to obtain the best high temperature performance a 1:1 molar ratio of $K_2O:Al_2O_3$ is recommended; (iii) to obtain high temperature mechanical resilience, heat treatment of the fibres is recommended. Although the disclosed compositions have improved overall performance in comparison to conventional low biopersistent fibres, there still remains a need to improve performance, particularly at high temperatures.

SUMMARY

According to one or more embodiments of the disclosure, an inorganic fibre composition that has improved performance at high temperatures with low biopersistence is provided.

DETAILED DESCRIPTION

Accordingly, a first aspect of the disclosure provides an inorganic fibre comprising:

| | |
|---|---|
| $SiO_2$ | 38.0 to 46.0 wt. % |
| $Al_2O_3$ | 33.0 to 42.0 wt. % |
| $K_2O$ | 18.5 to 23.0 wt. % | wherein the sum of the wt. % of $SiO_2$ and $Al_2O_3$ and $K_2O$ being greater than 95 wt. % of the total weight of the inorganic fibre; wherein the sum of the wt. % of CaO and MgO and $Na_2O$ in the inorganic fibre is less than or equal to 1.0 wt. %.

In specific embodiments, the inorganic fibre comprises:

| | |
|---|---|
| $SiO_2$ | 40.0 to 46.0 wt. % |
| $Al_2O_3$ | 33.0 to 42.0 wt. % |
| $K_2O$ | 20.0 to 23.0 wt. % | wherein the sum of the wt. % of $SiO_2$ and $Al_2O_3$ and $K_2O$ being greater than 95 wt. % of the total weight of the inorganic fibre; wherein the sum of the wt. % of CaO and MgO and Na$_2$O in the inorganic fibre is less than or equal to 1.0 wt. %.

In another embodiment, the inorganic fibre comprises:

| | |
|---|---|
| SiO$_2$ | 38.0 to 46.0 wt. % |
| Al$_2$O$_3$ | 33.0 to 42.0 wt. % |
| K$_2$O | 20.0 to 23.0 wt. % | wherein the sum of the wt. % of SiO$_2$ and Al$_2$O$_3$ and K$_2$O being greater than 95 wt. % of the total weight of the inorganic fibre; wherein the sum of the wt. % of CaO and MgO and Na$_2$O in the inorganic fibre is less than or equal to 0.7 wt. %.

In an alternative embodiment, the inorganic fibre comprises:

| | |
|---|---|
| SiO$_2$ | 41.0 to 46.0 wt. % |
| Al$_2$O$_3$ | 34.5 to 42.0 wt. % |
| K$_2$O | 20.0 to 25.0 wt. % | wherein the sum of the wt. % of SiO$_2$ and Al$_2$O$_3$ and K$_2$O being greater than 95 wt. % of the total weight of the inorganic fibre; wherein the sum of the wt. % of CaO and MgO and Na$_2$O in the inorganic fibre is less than or equal to 1.0 wt. %.

It should be noted that absolute values are used to measure the amounts of SiO$_2$, Al$_2$O$_3$, and K$_2$O of the inorganic fibres of the present disclosure, such that the total weight of the inorganic fibre may be between 95 wt. % and 105 wt. %, for example, between 97 wt. % and 103 wt. %.

In specific embodiments, the sum of the wt. % of CaO and MgO and Na$_2$O in the inorganic fibre is less than or equal to 0.9 wt. % or 0.8 wt. % or 0.7 wt. % or 0.6 wt. % or 0.5 wt. % or 0.4 wt. % or 0.3 wt % or 0.2 wt % or 0.1 wt %.

In further specific embodiments, MgO is not deliberately added to the composition (i.e. present as an impurity) or the % wt % of MgO is less than 0.1 wt % or less than 0.08 wt % or less than 0.05 wt %.

In more specific embodiments, the sum of the wt. % of CaO and MgO and Na$_2$O and B$_2$O$_3$ and SrO in the inorganic fibre is less than or equal to 0.9 wt. % or 0.8 wt. % or 0.7 wt. % or 0.6 wt. % or 0.5 wt. % or 0.4 wt. % or 0.3 wt % or 0.2 wt % or 0.1 wt %.

In another embodiment, the wt. % of CaO or MgO or Na$_2$O or B$_2$O$_3$ or SrO in the inorganic fibre is less than or equal to 0.9 wt. % or 0.8 wt. % or 0.7 wt. % or 0.6 wt. % or 0.5 wt. % or 0.4 wt. % or 0.3 wt % or 0.2 wt % or 0.1 wt %. Low levels of B$_2$O$_3$ and MgO are preferred as their presence may promote crystallite formation.

In a second aspect of the present disclosure, there is provided an inorganic fibre comprising:

| | |
|---|---|
| SiO$_2$ | 38.0 to 46.0 wt. % |
| Al$_2$O$_3$ | 33.0 to 42.0 wt. % |
| K$_2$O | 18.5 to 23.0 wt. % | the sum of the wt. % of SiO$_2$ and Al$_2$O$_3$ and K$_2$O being greater than 95 wt. % of the total weight of the inorganic fibre; the wt. % of CaO and one of MgO or Na$_2$O in the inorganic fibre is less than 2.5 wt. %.

In one embodiment, the sum of the wt % of CaO and MgO and Na$_2$O in the inorganic fibre is preferably less than 2.5 wt %, even more preferably less than 2.0 wt % and yet even more preferably less than 1.0 wt %.

In a third aspect of the present disclosure, there is provided an inorganic fibre comprising:

| | |
|---|---|
| SiO$_2$ | 38.0 to 46.0 wt. % |
| Al$_2$O$_3$ | 33.0 to 42.0 wt. % |
| K$_2$O | 18.5 to 23.0 wt. % | the sum of the wt. % of SiO$_2$ and Al$_2$O$_3$ and K$_2$O being greater than 95 wt. % of the total weight of the inorganic fibre; and wherein the pressure retained value at 10 minutes at 900° C. is greater than 20 kPa.

In a fourth aspect of the present disclosure there is provided an inorganic fibre comprising:

| | |
|---|---|
| SiO$_2$ | 39.0 to 46.0 wt. % |
| Al$_2$O$_3$ | 33.0 to 39.0 wt. % |
| K$_2$O | 18.5 to 23.0 wt. % | the sum of the wt. % of SiO$_2$ and Al$_2$O$_3$ and K$_2$O being greater than 95 wt. % of the total weight of the inorganic fibre; and wherein the pressure retained at 10 minutes at 900° C./(Arithmetic diameter of fibre)$^2$ is greater than 1.2.

In specific embodiments, the arithmetic mean fibre diameter of the fibre will be equal or less than 10 microns, for example, equal to or less than 9, 8, 7, 6, 5 microns. In an embodiment the arithmetic mean diameter of the fibre will be from 1 to 5 microns, say 2 to 4 microns.

In embodiments, the inorganic fibre may comprise:

| | |
|---|---|
| SiO$_2$ | 39.5 to 46.0 wt. % |
| Al$_2$O$_3$ | 34.0 to 38.5 wt. % |
| K$_2$O | 18.5 to 22.2 wt. % |

In embodiments, the sum of the wt. % of SiO$_2$ and Al$_2$O$_3$ and K$_2$O in the inorganic fibre may be greater than 96.0 wt. %. For example, the sum of the wt. % of SiO$_2$ and Al$_2$O$_3$ and K$_2$O in the inorganic fibre may be greater than 97.0 wt. %, for example, greater than 98.0%. In embodiments, the sum of the wt. % of SiO$_2$ and Al$_2$O$_3$ and K$_2$O in the inorganic fibre may be greater or equal to 99.0 wt. % or greater or equal to 99.5 wt. %; or greater or equal to 99.7 wt. %.

The SiO$_2$ in the inorganic fibre may be between any one of 38.0, 38.5, 39.0, 39.5, 40.0, 40.5, 41.0, 41.5, 42.0, 42.5, 43.0, 43.5, 44.0, 45.5, 44.0 wt % and any one of 46.0, 45.5, 45.0, 44.5, 44.0, 43.5, 43.0, 42.5, 42.0, 41.5, 41.0, 40.5, 40.0, 39.5, 39.0 and 38.5 wt. %, for example, between 39.0 to 45 wt. %, or between 40.0 to 44.0 wt. %, or between 41.0 to 43.0 wt. %, or between 42.0 to 43.0 wt. %. The SiO$_2$ in the inorganic fibre may be between 38.0 to 45.0 wt. %, or 38.0 to 44.0 wt. %, or 38.0 to 43.0 wt. %, or 38.0 to 42.0 wt. %, or 38.0 to 41.0 wt. %, or 38.0 to 40.0 wt. %, or 38.0 to 39.0 wt. %. The SiO$_2$ in the inorganic fibre may be between 39.0 to 46.0 wt. %, or 40.0 to 46.0 wt. %, or 41.0 to 46.0 wt. %, or 42.0 to 46.0 wt. %, or 43.0 to 46.0 wt. %, or 44.0 to 46.0 wt. %, or 45.0 to 46.0 wt. %.

The Al$_2$O$_3$ in the inorganic fibre may be between any one of 33.0, 33.5, 34.0, 34.5, 35.0, 35.5, 36.0, 36.5, 37.0, 37.5, 38.0, 38.5, 39.0, 39.5, 40.0, 40.5, 41.0, 41.5 wt % and any one of 42.0, 41.5, 41.0, 40.5, 40.0, 39.5, 39.0, 38.5, 38.0, 37.5, 37.0, 36.5, 36.0, 35.5, 35.0, 34.5, 34.0, 33.5 wt. %, for example, between 34.0 to 41.0 wt. %, or between 35.0 to 40.0 wt. %, or between 36.0 to 39.0 wt. %, or between 37.0 to 38.0 wt. %. The $Al_2O_3$ in the inorganic fibre may be between 33.0 to 41.0 wt. %, or 33.0 to 40.0 wt. %, or 33.0 to 39.0 wt. %, or 33.0 to 38.0 wt. %, or 33.0 to 37.0 wt. %, or 33.0 to 36.0 wt. %, or 33.0 to 35.0 wt. %, or 33.0 to 34.0 wt. %. The $Al_2O_3$ in the inorganic fibre may be between 34.0 to 42.0 wt. %, or 35.0 to 42.0 wt. %, or 36.0 to 42.0 wt. %, or 37.0 to 42.0 wt. %, or 38.0 to 42.0 wt. %, or 39.0 to 42.0 wt. %, or 40.0 to 42.0 wt. %, or 41.0 to 42.0 wt. %.

The $K_2O$ in the inorganic fibre may be between any one of 18.5, 19.0, 19.5, 20.0, 20.5, 21.0, 21.5, 22.0, 22.5 wt % and any one of 23.0, 22.5, 22.0, 21.5, 21.0, 19.5, 19.0 wt. %, for example, between 19.0 to 22.5 wt. %, or between 19.5 to 22.0 wt. %, or between 20.0 to 21.5 wt. %, or between 20.5 to 21.0 wt. %. The $K_2O$ in the inorganic fibre may be between 18.5 to 22.5 wt. %, or 18.5 to 22.0 wt. %, or 18.5 to 21.5 wt. %, or 18.5 to 21.0 wt. %, or 18.5 to 20.5 wt. %, or 18.5 to 20.0 wt. %, or 18.5 to 19.5 wt. %, or 18.5 to 19.0 wt. %. The $K_2O$ in the inorganic fibre may be between 19.0 to 23.0 wt. %, or 19.5 to 23.0 wt. %, or 20.0 to 23.0 wt. %, or 20.5 to 23.0 wt. %, or 21.0 to 23.0 wt. %, or 21.5 to 23.0 wt. %, or 22.0 to 23.0 wt. %, or 22.5 to 23.0 wt. %.

Preferably, the inorganic fibre is amorphous. It has been surprisingly found that the inorganic fibre of the disclosure has acceptable mechanical performance without the need for heat treatment of the inorganic fibres, in contrast to inorganic fibre described in U.S. Pat. No. 8,088,701 B2.

The fibre may be provided as a part of a fibre composition. The inorganic fibre may be provided, for example, as a pick of fibres, a collection of fibres, a pile of fibres, a sheet of fibres. The fibre may be short or long.

For example, for mat and/or blanket production, fibres preferably have a fibre length of at least 10 mm, for example, at least 50 mm, or at least 100 mm, or at least 200 mm. The fibre length of at least 200 mm is particularly preferred to enable the mat and/or blanket (woven or non-woven) to have sufficient mechanical strength.

When formed in a mat, the thickness is preferably in the range of 1 mm and 20 mm. The basis weight of the mat is preferably in the range of 50 to 4000 gsm.

Advantageously, it has been shown that the inorganic fibres of the present disclosure have an improved performance at high temperatures in comparison with the inorganic fibre compositions disclosed in U.S. Pat. No. 8,088,701 B2, whilst maintaining low biopersistence characteristics. The high temperature strength of the inorganic fibres of the disclosure may be tested using a 'fixed gap hot compression test', the details of which are described below. The results of this test provide a value (kPa) for the pressure retained after being held at 900° C. for 10 minutes.

The inorganic fibres according to the disclosure may have a pressure retained value at 10 minutes at 900° C. of greater than 20 kPa. For example, the pressure retained value at 10 minutes at 900° C. may be greater than 21 kPa, 22 kPa, 23 kPa, 24 kPa, 25 kPa, 26 kPa, 27 kPa, 28 kPa, 29 kPa, 30 kPa 31 kPa, 32 kPa, 33 kPa, 34 kPa, 35 kPa, 36 kPa, 37 kPa, 38 kPa, or greater than 39 kPa. In embodiments, the pressure retained value at 10 minutes at 900° C. may be greater than 40 kPa.

The arithmetic mean fibre diameter of the inorganic fibres of the disclosure may be less than 10 μm. For example, the arithmetic diameter of the inorganic fibres of the disclosure may be less than 9 μm, for example, less than 8 μm, or less than 7 μm, or less than 6 μm, or less than 5 μm, or less than 4 μm, or less than 3 μm, or less than 2 μm. Extra fine fibre diameters can be achieved using high speed spinning techniques as disclosed by the applicant in WO2017/121770 (which is incorporated herein in its entirety by reference).

The value for the strength per cross-sectional area (Equation 1) may be greater than 1.2 kPa/μm² or greater than 1.5 kPa/μm² or greater than 2.0 kPa/μm² or greater than 2.5 kPa/μm² or greater than 3.0 kPa/μm² or greater than 4.0 kPa/μm² or greater than 5.0 kPa/μm² or greater than 6.0 kPa/μm².

$$\text{Strength per cross sectional area} = \frac{\text{Pressure retained at 10 mins at 900}° \text{C.}}{(\text{Arithmetic mean of fibre})^2} \quad \text{(Equation 1)}$$

Advantageously, the inorganic fibres of the disclosure may be used in applications in which the fibres are exposed to a temperature at or above 800° C.

In embodiments, up to 10 wt % of the $Al_2O_3$ may be substituted with $La_2O_3$. In embodiments up 10 wt % of the $SiO_2$ may be substituted with $ZrO_2$, wherein the substituted portion is calculated as the wt. % of the fibre. In this case, the sum of the wt. % of $SiO_2$ and $Al_2O_3$ and $K_2O$ and $La_2O_3$ and $ZrO_2$ is greater than 95 wt. % of the total weight of the inorganic fibre.

A yet further aspect of the disclosure provides an inorganic fibre comprising:

| | |
|---|---|
| X | 38.0 to 46.0 wt. % |
| Y | 33.0 to 42.0 wt. % |
| $K_2O$ | 18.5 to 23.0 wt. % | the sum of the wt. % of X and Y and $K_2O$ being greater than 95 wt. % of the total weight of the inorganic fibre; and wherein X is the wt % sum of $SiO_2$ and $ZrO_2$, wherein $ZrO_2$ is present in up to 10 wt. % of the total weight of the inorganic fibre and Y is the wt. % sum of $Al_2O_3$ and $La_2O_3$ wherein $La_2O_3$ is present in up to 10 wt. % of the total weight of the inorganic fibre.

In specific embodiments, the inorganic fibre comprises:

| | |
|---|---|
| X | 40.0 to 46.0 wt. % |
| Y | 33.0 to 42.0 wt. % |
| $K_2O$ | 20.0 to 23.0 wt. % | wherein the sum of the wt. % of CaO and MgO and $Na_2O$ in the inorganic fibre is less than or equal to 1.0 wt. %.

In another embodiment, the inorganic fibre comprises:

| | |
|---|---|
| X | 38.0 to 46.0 wt. % |
| Y | 33.0 to 42.0 wt. % |
| $K_2O$ | 20.0 to 23.0 wt. % | wherein the sum of the wt. % of CaO and MgO and $Na_2O$ in the inorganic fibre is less than or equal to 0.7 wt. %.

In an alternative embodiment, the inorganic fibre comprises:

| | |
|---|---|
| X | 41.0 to 46.0 wt. % |
| Y | 34.5 to 42.0 wt. % |
| $K_2O$ | 20.0 to 25.0 wt. % | wherein the sum of the wt. % of CaO and MgO and $Na_2O$ in the inorganic fibre is less than or equal to 1.0 wt. %.

In embodiments where X is the wt. % sum of $SiO_2$ and $ZrO_2$, the $ZrO_2$ may be present in up to any one of 9 wt. %, 8 wt. %, 7 wt. %, 6 wt. %, 5 wt. %, 4 wt. %, 3 wt. %, 2 wt. %, 1 wt. %, 0.5 wt. %, 0.4 wt. % or 0.2 wt. % or 0.0 wt % of the total weight of the inorganic fibre.

In embodiments, where Y is the wt. % sum of $Al_2O_3$ and $La_2O_3$, $La_2O_3$ may be present in up to any one of 9 wt. %, 8 wt. %, 7 wt. %, 6 wt. %, 5 wt. %, 4 wt. %, 3 wt. %, 2 wt. %, 1 wt. %, 0.5 wt. %, 0.4 wt. % or 0.2 wt. % or 0.0 wt % of the total weight of the inorganic fibre.

In embodiments, the sum of the wt. % of CaO and MgO and $Na_2O$ in the inorganic fibre is less than or equal to 1.0 wt. % or less than or equal to 0.5 wt. % or less than or equal to 0.3 wt. % or less than or equal to 0.1 wt %.

In embodiments; the wt. % of CaO and one of MgO or $Na_2O$ in the inorganic fibre is less than 2.5 wt. %.

In some embodiment, the amount of $B_2O_3$ is less than 0.1 mol %.

The pressure retained value at 10 minutes at 900° C. may be greater than 20 kPa and/or the Pressure retained at 10 minutes at 900° C./(Arithmetic diameter of fibre)$^2$ may be greater than 1.2.

A further aspect of the disclosure provides a fibre mat fabricated from the inorganic fibres of the disclosure. The fibre mat fabricated from the inorganic fibres of the disclosure may be coated with one or more inorganic coatings, for example, the fibre mat may be coated with inorganic colloidal solutions, e.g. colloidal silica and/or colloidal alumina. Coating the fibre mat may alter the properties of the inorganic fibres in the fibre mat. For example, coating the fibre mat may alter the coefficient of friction and/or improve the high temperature resilience of the fibre mat of the disclosure. The fibre mat may be coated by any technique known to those skilled in the art, e.g. dipping, spray coating and/or vapour deposition.

The fibre mat fabricated from the inorganic fibres of the disclosure may further comprise inorganic fillers and/or additives. For example, suitable inorganic fillers and/or additives may include vermiculite, colloidal solutions, e.g. silica and/or alumina, alkali/alkaline earth silicates and aluminosilicates. Examples of suitable material which may be used in the processing or which may be incorporated into the fibre may include the materials listed in Tables 1 & 2 of 2017/0002717 which is incorporated herein by reference. Lubricants may also be used to facilitate mounting of the fibre mat, particularly on fragile structure and/or when multiple substrates are mounted together. An example of suitable lubricant is provided in US20180363522 which is incorporated herein by reference.

The inorganic fillers and/or additives may be fabricated using any suitable method known to the skilled person, for example, from a melt and/or using a sol-gel method.

The fibre mat fabricated from the inorganic fibres of the disclosure may be fabricated in any process known to the skilled person, e.g. in a wet or air laid process, and/or in a needle-punching, stitch-bonding, hydro-entangling, binder impregnation process. The use of inorganic fillers and/or additives in a wet laid fibre mat fabricated from the inorganic fibres of the disclosure may improve the properties of the fibre mat, e.g. the high temperature strength and/or resilience of the fibre mat of the disclosure may be improved.

The fibre mat fabricated from the inorganic fibres of the disclosure may be blended with a mix of additional fibres. For example, suitable additional fibres include mullite, alumina, aluminosilicate and/or low biopersistent melt formed sol-gel fibres.

The fibre mat may be fabricated using a blend of the inorganic fibres of the disclosure, and additional fibres, in a wet or air laid process. The fibre mat fabricated in this process may be a support mat for a catalytic converter. Blending additional fibres with the inorganic fibres of the disclosure, e.g. in a wet or air laid process, may provide a fibre mat, e.g. a support mat; heating shield cover or end cone, with improved high temperature strength and/or resilience.

The fibre mat may be formed into a 3D shape (e.g. end cone or heat-shielding cover) with the fibre mat being saturated, soaked, coated, sprayed or otherwise impregnated throughout all, most or at least a substantial portion of its thickness with the aqueous mixture so as to be wet and pliable. The fibre mat can be impregnated with the aqueous mixture before or after being formed into the shape of the 3D shape. After impregnation, the impregnated fibre mat is pliable. It is dried so as to form a rigid 3D shape. As used herein, the term "dried" refers to the pliable 3D shape being heated to a temperature that is hot enough and for a time that is long enough to cause the pliable 3D shape (i.e., the aqueous mixture) to harden and become a rigid 3D shape.

The aqueous mixture used to impregnate the fabric may be a slurry comprising water, an inorganic binder and inorganic filler particles, like that disclosed in International PCT Application Publication Number WO 2013/044012 A1, which is incorporated herein by reference in its entirety. Although the weight percent of each component within the slurry may vary, typically a given slurry comprises from about 20.0 to about 54.0% wt of water, from about 1.0 to about 36.0% wt of one or more inorganic binders, and from about 10.0 to about 70.0% wt of inorganic filler particles, based on a total weight of the slurry. More typically, a given slurry comprises from about 22.0 to about 45.0% wt of water, from about 5.0 to about 30.0% wt of one or more inorganic binders, and from about 20.0 to about 55.0% wt of inorganic filler particles, based on a total weight of the slurry.

Although the particle size of the inorganic binder material is not limited, typically, the inorganic binder comprises inorganic binder particles having a maximum particle size of about 500 nm, preferably a maximum particle size of about 200 nm. More typically, the inorganic binder comprises inorganic binder particles having a particle size ranging from about 1.0 to about 100 nm.

Further, although the particle size of the inorganic filler particles is not limited, typically, the inorganic filler particles have a maximum particle size of about 100 microns (μm). More typically, the inorganic filler particles have a particle size ranging from about 0.1 μm to about 100 μm. Even more typically, the inorganic filler particles have a particle size ranging from about 0.2 μm to about 50 μm.

In alternative embodiments, the binder may be an organic binder. The fibre mat fabricated from the inorganic fibres of the disclosure may be secured to one or more additional fibre mats, e.g. additional fibre mats fabricated from fibres that are the same, or different, to those of the disclosure. Suitable techniques to form a multilayer fibre mat are disclosed in U.S. Pat. No. 8,277,925 which is incorporated herein by reference.

The fibre mat fabricated from the inorganic fibres of the disclosure, e.g. fabricated in a needling process or in a wet or air laid process, may be secured, e.g. adhered, laminated, or veneered to one or more additional fibre mats, e.g. additional fibre mats fabricated from fibres that are different to those of the disclosure, to form a hybrid fibre mat, e.g. a hybrid support mat.

The hybrid fibre mat may be used as a support mat comprising a major surface facing a higher temperature and a major surface facing a lower temperature, e.g. facing a steel can. The high temperature surface may comprise an additional fibre mat, the additional fibre mat comprising a suitable fibre known to the skilled person, e.g. polycrystalline wool (PCW). The low temperature surface of the hybrid fibre mat may comprise the fibre mat fabricated from the inorganic fibres of the disclosure. In this way, a hybrid fibre mat of this description may exhibit improved high temperature strength by using a superior fibre (e.g. PCW) on the hot face/surface, and a lower grade, but more cost-effective fibre (e.g. the inorganic fibres of the disclosure) on the cold face/surface.

In a further aspect of the present disclosure, there is provided a pollution control device further comprising a housing and a hybrid fibre mat, as previous defined, disposed therein, said hybrid fibre mat comprising a hot surface facing a heat source and a cold surface facing an opposing direction to the heat source, wherein a second mat forms part of the hot surface. Preferably, the first mat forms part of the cold surface.

The second mat preferably comprises or consists of polycrystalline wool (PCW) or fibre. Preferably, the second mat has a higher mechanical resilience at high temperature relative to the first mat, with the second mat insulating the first mat from the heat source. This configuration provides a hybrid mat in which the layers are appropriately rated according to the layer's position within the pollution device.

An example of a suitable PCW is disclosed in WO2018/093624 which describes the use of aluminosilicate ceramics fibres comprising an average mullite content of at least 75 wt. % A further example of a suitable PCW is disclosed in WO2018/060734 which describes the use of ceramic fibres comprising oxides of Si—Al—Sr. Other suitable PCW are provided in U.S. Pat. No. 9,816,420 (column 5, line 58 to column 6, line 12).

Commercially available polycrystalline fibres include Saffil LDM alumina fibers available from Unifrax (Tonawanda, N.Y.), or MLS2 and MLS3 alumina/silica fibers available from Mitsubishi Plastic, Inc. (Tokyo, Japan). Fibers having diameters less than 3 micrometers can be found in all of these commercially-available discrete ceramic fibers and products made with them, which makes the fibers potentially respirable (e.g., breathable).

The additional fibre mat that is for attachment to the fibre mat fabricated from the inorganic fibres of the disclosure may be fabricated in any suitable process known to the skilled person, e.g. in a in a wet or air laid process, and/or in a needling process. The additional fibre mat may comprise fibres, e.g. inorganic fibres, fabricated from melt produced fibres. Suitable fibres for the additional fibre mat include mullite, alumina, and/or low biopersistent sol-gel fibres.

Fibres of the disclosure, for example the fibre mat or hybrid mat, may be used as a catalyst or monolith support mat and/or end cone in a catalytic converter.

A further aspect of the disclosure provides a mat, for example a monolith support mat or end cone insulator, the mat comprising:

inorganic fibres having a strength per cross sectional area of greater than 1.2 kPa/$\mu m^2$; and
preferably a binder (inorganic and/or organic)

wherein the inorganic fibres are amorphous and/or have a arithmetic mean of less than 10 μm and preferably have a dissolution rate of at least 150 ng/cm$^2$/hr (saline at pH 4.5).

A yet further aspect of the disclosure provides a mat, for example a monolith support mat or end cone insulator, the mat comprising:

inorganic fibres having a pressure retained value at 10 minutes at 900° C. of greater than 20 kPa; and
preferably a binder (inorganic and/or organic)

wherein the inorganic fibres preferably are amorphous and/or have a arithmetic mean of less than 10 μm and preferably have a dissolution rate of at least 150 ng/cm$^2$/hr (saline at pH 4.5).

The fibres preferably comprise X and Y and $K_2O$ (preferably >10 wt %; and more preferably >15 wt %), the sum of which is preferably greater than 95 wt. %, say greater than 96, 97, 98, 99 wt. %. Wherein X is the sum of $SiO_2$ and $ZrO_2$ and Y is the sum of $Al_2O_3$ and $La_2O_3$. $ZrO_2$ and $La_2O_3$ may each be present in less than 10 wt. of the fibre.

The mats are beneficially used in high temperature applications (e.g. >800° C. or >900° C.).

The mat may be used in a number applications such as within a filtration article, a thermal insulation article, an acoustic insulation article, a fire protection article, a mounting mat for a vehicle component, a gasket, a catalyst support, and combinations thereof.

A binder (organic and/or inorganic) may be advantageously used to facilitate formation of the mat. In some embodiments, mats described herein comprise not greater than 20 or 10 (in some embodiments not greater than 4, 3, 2, 1, 0.75, 0.5, 0.25, or even not greater than 0.1) percent by weight binder, based on the total weight of the mat, while others contain no binder.

Suitable organic binders may be selected from a (meth) acrylic (co)polymer, poly(vinyl) alcohol, poly (vinyl)pyrrolidone, poly(vinyl) acetate, polyolefin, polyester, and combinations thereof. Other suitable organic binder materials can include aqueous polymer emulsions, solvent-based polymers, and solvent free polymers. The aqueous polymer emulsions can include organic binder polymers and elastomers in the form of a latex (e.g., natural rubber lattices, styrene-butadiene lattices, butadiene-acrylonitrile lattices, and lattices of acrylate and methacrylate polymers or copolymers). The solvent-based polymeric binder materials can include a polymer such as an acrylic, a polyurethane, a vinyl acetate, a cellulose, or a rubber based organic polymer. The solvent free polymers can include natural rubber, styrene-butadiene rubber, and other elastomers.

Suitable inorganic binders may be selected from silica, alumina, zirconia, kaolin clay, bentonite clay, silicate, micaceous particles, and combinations thereof, optionally wherein the binder is substantially free of silicone materials. In one embodiment, the inorganic binder is a colloidal material, such as a clay or metal hydroxide (e.g. aluminum hydroxide, silicon hydroxide, titanium hydroxide, yttrium hydroxide, or a combination thereof.)

In some embodiments, the fibre mat forms part of a pollution control device and further comprises an intumescent layer, a reinforcing mesh, a non-intumescent insert, or a combination thereof.

According to another embodiment, the fibre mat is an intumescent fibre mat, comprising intumescent material disposed in the mat. The present disclosure can be used for non-intumescent mats as well as. An intumescent mat is a mat that contains an intumescent material. As used herein, "intumescent material" means a material that expands, foams, or swells when exposed to a sufficient amount of thermal energy. As used herein, "non-intumescent mat" means a mat that does not contain any intumescent material or at least not enough of an intumescent material to contribute a significant amount to the holding pressure exerted by the mounting mat.

Useful intumescent materials for use in making an intumescent mat include, but are not limited to, unexpanded vermiculite ore, treated unexpanded vermiculite ore, partially dehydrated vermiculite ore, expandable graphite, mixtures of expandable graphite with treated or untreated unexpanded vermiculite ore, processed expandable sodium silicate, for example EXPANTROL™ insoluble sodium silicate, commercially available from 3M Company, St. Paul, Minn., and mixtures thereof. An example of a desirable commercially available expandable graphite material is GRAFOIL™ Grade 338-50 expandable graphite flake, from UCAR Carbon Co., Inc., Cleveland, Ohio. In a particular embodiment, the intumescent material may be included in and distributed in the fiber mat.

Suitable intumescent layers, reinforcing meshes, and non-intumescent inserts are described, for example, in U.S. Pat. Nos. 3,001,571 and 3,916,057 (Hatch et al.); U.S. Pat. Nos. 4,305,992, 4,385,135, 5,254,416 (Langer et al.); U.S. Pat. No. 5,242,871 (Hashimoto et al.); U.S. Pat. No. 5,380,580 (Rogers et al); U.S. Pat. No. 7,261,864 B2 (Watanabe); U.S. Pat. Nos. 5,385,873 and 5,207,989 (MacNeil); and Pub. PCT App. WO 97/48889 (Sanocki et al.), the entire disclosures of each of which are incorporated by the extent allowable by national law.

In some such exemplary embodiments, the pollution control device may be installed in a motor vehicle exhaust system of a motor vehicle selected from an automobile, a motorcycle, a truck, a boat, a submersible, or an aircraft.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. For the avoidance of doubt, the terms "may", "and/or", "e.g.", "for example" and any similar term as used herein should be interpreted as non-limiting such that any feature so-described need not be present. Indeed, any combination of optional features is expressly envisaged without departing from the scope of the disclosure, whether or not these are expressly claimed. The applicant reserves the right to change any originally filed claim or file any new claim accordingly, including the right to amend any originally filed claim to depend from and/or incorporate any feature of any other claim although not originally claimed in that manner.

To further exemplify the disclosure, reference is made to the following non-limiting Examples, with reference to the accompanying drawings in which.

Referring first to Table 1, there is shown the composition of inorganic fibres as % weight of the total composition according to Examples (1 to 13; 15-20) and Comparative Examples (CE1 to CE19) of the disclosure. The un-normalised results have been used.

TABLE 1

| Sample | $SiO_2$ | $Al_2O_3$ | $K_2O$ | $Na_2O$ | MgO | CaO | Total |
|---|---|---|---|---|---|---|---|
| 1 | 40.6 | 37.2 | 22.3 | 0.2 | 0.0 | 0.0 | 100.3 |
| 2 | 40.4 | 36.4 | 21.8 | 0.2 | 0.0 | 0.0 | 98.8 |
| 3 | 40.8 | 38.2 | 20.4 | 0.2 | 0.0 | 0.0 | 99.6 |
| 4 | 40.9 | 36.1 | 22.4 | 0.2 | 0.0 | 0.0 | 99.7 |
| 5 | 43.0 | 34.0 | 19.7 | 0.2 | 0.0 | 0.1 | 96.9 |

TABLE 1-continued

| Sample | $SiO_2$ | $Al_2O_3$ | $K_2O$ | $Na_2O$ | MgO | CaO | Total |
|---|---|---|---|---|---|---|---|
| 6 | 44.7 | 34.6 | 20.3 | 0.3 | 0.0 | 0.2 | 99.9 |
| 7 | 43.5 | 35.3 | 20.6 | 0.2 | 0.0 | 0.1 | 99.6 |
| 8 | 42.0 | 35.5 | 22.0 | 0.2 | 0.0 | 0.1 | 99.8 |
| 9 | 41.3 | 36.0 | 21.2 | 0.2 | 0.0 | 0.0 | 100.1 |
| 10 | 40.5 | 35.2 | 22.3 | 0.2 | 0.0 | 0.0 | 98.2 |
| 11 | 40.7 | 36.5 | 22.4 | 0.2 | 0.0 | 0.0 | 99.9 |
| 12 | 39.9 | 37.1 | 22.3 | 0.3 | 0.0 | 0.0 | 99.5 |
| 13 | 45.5 | 35.6 | 18.8 | 0.3 | 0.0 | 0.0 | 100.2 |
| 15-16 | 41.2 | 36.3 | 22.6 | 0.3 | 0.0 | 0.0 | 100.6 |
| 17-20 | 40.7 | 36.7 | 22.1 | 0.2 | 0.0 | 0.0 | 99.6 |
| C1 | 37.4 | 45.1 | 17.5 | 0.2 | 0.0 | 0.0 | 100.1 |
| C2 | 30.4 | 52.0 | 17.3 | 0.2 | 0.0 | 0.0 | 99.9 |
| C3 | 41.0 | 40.9 | 17.4 | 0.2 | 0.0 | 0.1 | 99.5 |
| C4 | 37.6 | 42.9 | 19.3. | 0.2 | 0.0 | 0.0 | 99.9 |
| C5 | 31.4 | 49.5 | 18.9 | 0.2 | 0.0 | 0.0 | 100.0 |
| C6 | 35.7 | 44.3 | 19.8 | 0.2 | 0.0 | 0.0 | 100.0 |
| C7 | 25.6 | 53.9 | 20.0 | 0.2 | 0.0 | 0.0 | 99.6 |
| C8 | 36.1 | 43.2 | 20.2 | 0.2 | 0.0 | 0.0 | 99.7 |
| C9 | 30.6 | 50.1 | 19.4 | 0.2 | 0.0 | 0.0 | 100.4 |
| C10 | 37.0 | 42.0 | 20.8 | 0.2 | 0.0 | 0.0 | 99.9 |
| C11 | 42.5 | 41.3 | 15.1 | 0.2 | 0.1 | 0.0 | 99.1 |
| C12 | 37.4 | 43.8 | 17.5 | 0.2 | 0.0 | 0.0 | 99.0 |
| C13 | 38.7 | 40.8 | 19.5 | 0.2 | 0.0 | 0.0 | 99.2 |
| C14 | 32.0 | 46.3 | 19.5 | 0.3 | 0.0 | 0.0 | 99.5 |
| C15 | 31.9 | 47.0 | 20.7 | 0.3 | 0.0 | 0.0 | 99.9 |
| C16 | 32.9 | 45.0 | 21.9 | 0.3 | 0.0 | 0.0 | 99.9 |
| C17 | 38.5 | 38.2 | 21.9 | 0.2 | 0.0 | 0.0 | 98.8 |
| C18 | 38.2 | 36.0 | 25.3 | 0.3 | 0.0 | 0.0 | 99.9 |
| C19 | 46.4 | 35.8 | 17.7 | 0.3 | 0.0 | 0.0 | 100.1 |

It is noted that some of the Comparative Examples are repeats of samples disclosed in U.S. Pat. No. 8,088,701 B2. Referring now to Table 2, there is shown the original inorganic fibre compositions disclosed in U.S. Pat. No. 8,088,701 B2 and the corresponding Comparative Examples disclosed in the present application.

TABLE 2

| Sample of U.S. Pat No. 8,088,701B2 | $SiO_2$ | $Al_2O_3$ | $K_2O$ | $Na_2O$ | Repeat |
|---|---|---|---|---|---|
| KAS30 | 35.9 | 36.3 | 25.6 | 0.0 | C18 |
| KAS31 | 37.5 | 40.1 | 20.6 | 0.0 | C13, C17 |
| KAS33 | 45.4 | 36.7 | 17.4 | 0.0 | C19 |

Referring now to Table 3, there is shown the composition of inorganic fibres as % weight of the total composition according to Examples (14) and Comparative Examples (C20 to C25) of the disclosure. In these compositions, $K_2O$ is substituted for other cations to demonstrate effect of substitution and/or impurities levels on high temperature strength. The un-normalised results have been used and all other measured impurities (e.g. $Fe_2O_3$) 0.1 wt % or less.

TABLE 3

| Sample | $SiO_2$ | $Al_2O_3$ | $K_2O$ | $Na_2O$ | MgO | CaO | Total | $K_2O + Na_2O + CaO + MgO$ |
|---|---|---|---|---|---|---|---|---|
| 14 | 42.0 | 35.5 | 22.2 | 0.2 | 0.0 | 0.1 | 99.6 | 22.5 |
| C20 | 41.9 | 35.6 | 21.2 | 1.1 | 0.0 | 0.0 | 100.0 | 22.3 |
| C21 | 41.7 | 36.5 | 20.0 | 2.2 | 0.0 | 0.0 | 100.4 | 22.2 |
| C22 | 42.0 | 36.3 | 20.7 | 0.2 | 1.0 | 0.0 | 100.1 | 21.9 |
| C23 | 41.2 | 36.4 | 20.0 | 0.1 | 2.1 | 0.0 | 100.3 | 22.2 |
| C24 | 41.8 | 36.2 | 20.9 | 0.2 | 0.3 | 1.0 | 100.4 | 22.4 |
| C25 | 42.6 | 35.9 | 20.1 | 0.2 | 0.1 | 1.7 | 100.7 | 22.1 |

Referring now to Table 4, there is shown the composition of inorganic fibres as % weight of the total composition according to the prior art. There is shown the composition for an engineered refractory fibre (RCF) available from Morgan Advanced Materials, Isofrax® from Unifrax Ltd, and Superwool® Xtra (SW XT) from Morgan Advanced Materials.

TABLE 4

| Sample | SiO$_2$ | Al$_2$O$_3$ | K$_2$O | ZrO$_2$ | MgO | Other | Total |
|---|---|---|---|---|---|---|---|
| RCF | 48.7 | 51.4 | 0 | 0 | 0 | 0 | 100.1 |
| Isofrax | 70.0-80.0 | 0 | 0 | 0 | >18.0-27.0 | <4.0 | |
| SW XT | 30 | 35 | 25.5 | 7 | 1.0 | 0.25 | 98.75 |

The high temperature strength of the inorganic fibre of each of the Examples of the disclosure the Comparative Examples was tested using the fixed gap hot compression test. The results of this test provide a value (kPa) for the pressure retained at 10 minutes at 900° C. This provides a benchmark for the high temperature strength of each of the inorganic fibre compositions of the Examples and Comparative Examples.

Figure 1:
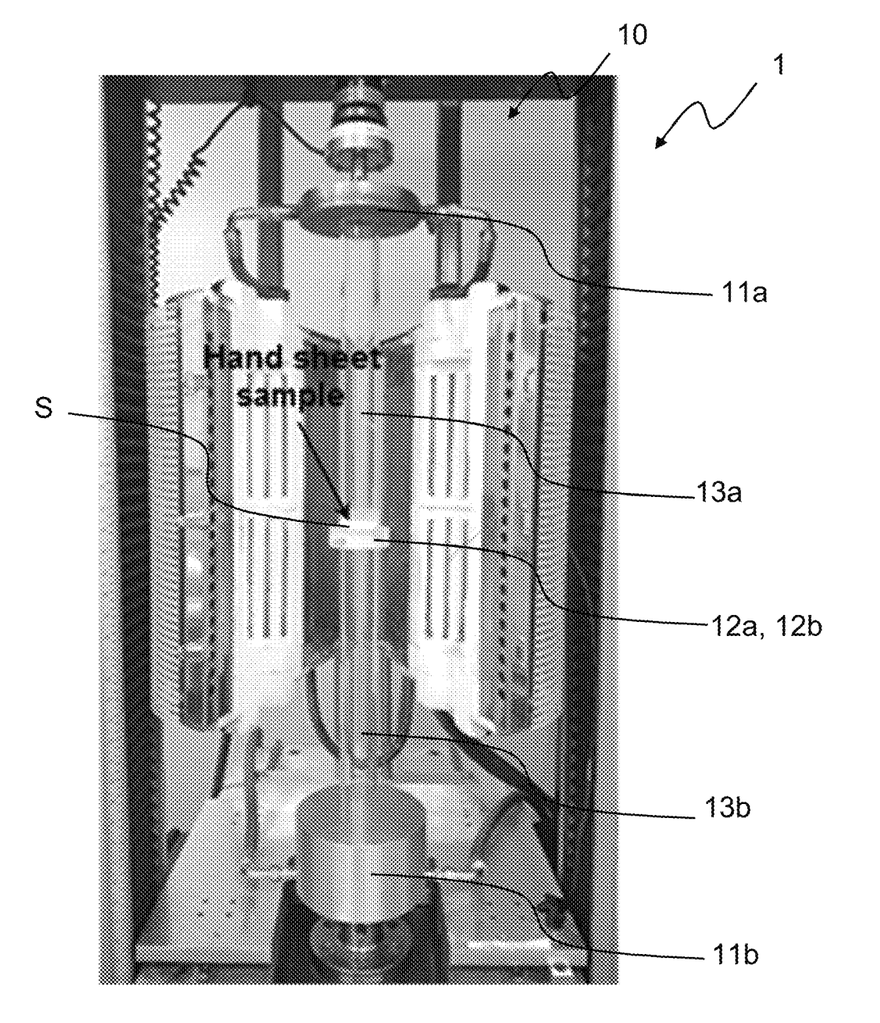
FIG. 1 is an apparatus for fixed gap hot compression testing.

Referring now to FIG. 1, there is shown an apparatus 1 for fixed gap hot compression testing, which is adapted from the heated cyclic compression test disclosed in U.S. Pat. No. 5,736,109. There is shown a mechanical test frame 10 comprising a pair of water-cooled platens 11a, 11b, a furnace (not shown), a pair of quartz discs 12a, 12b, and a pair of quartz tubes 13a, 13b. There is further shown a sample S (e.g. Example 1) to be tested. The pair of quartz tubes 13a, 13b, are positioned between the pair of water-cooled platens 11a, 11b.

During the test, the sample S (i.e. hand sheet sample) is located between the pair of quartz discs 12a, 12b.

The mechanical test frame 10 was purchased from Instron® of High Wycombe, Buckinghamshire, UK.

The sample S was fabricated in the following procedure:
Mix cleaned fibre (10.0 g) in water (600 mL).
Using a 75×75 mm vacuum forming mould with a 100 µm screen mesh (the suction base being filled with water and the vacuum pump off), pour the fibre slurry into the mould and manually stir to ensure uniformity.
Place the lid on top of the mix and turn the vacuum pump on slowly whilst pushing the lid down.
Move the vacuum formed fibre mat onto a flat surface and use a heavy rolling pin (once in each direction) to improve the uniformity of the mat.
Dry the resulting mat (75×75 mm) at 120° C.
Cut a 50 mm diameter round test sample from the centre of the vacuum formed mat to produce sample S, for use in the following high-temperature strength tests.

The grammage of samples produced with this method was between 1500-1700 g/m$^2$.

The method of conducting the fixed gap hot compression test on a sample S using the apparatus 1 is described as follows:
1. Place the sample S between the pair of quartz discs 12a, 12b.
2. Apply pressure through the pair of quartz tubes 13a, 13b by compressing the sample S at a rate of 5 mm/min to 0.6 g/cm$^3$ gap density at room temperature. Record as the 'initial pressure', the pressure produced as a result of resistance of the sample S to deformation at this density.
3. Initiate the heating cycle by heating the mechanical test frame 10 containing the sample from ambient temperature to 900° C. at a rate of 10° C./min followed by 10 minutes hold at 900° C., whilst maintaining the density/test gap of the sample S at a constant value through the heating cycle and 10 minute hold.
4. Record the pressure value produced (kPa) by the resistance of the sample S throughout the test, and specifically following the 10 minutes hold at 900° C.

Referring now to Table 5, there is shown the results of the fixed gap hot compression test, which were performed as described above, to determine the high temperature strength measurement of each of the Examples of the disclosure, and of the Comparative Examples. There is also shown the arithmetic mean fibre diameter (µm) for each of the Examples and Comparative Examples. The inorganic fibres according to the disclosure all exhibit a value for the pressure retained at 10 minutes at 900° C. of above 20 kPa and thus surprisingly show better high temperature resilience than fibres which fall outside of the current disclosure.

TABLE 5

| Example | Pressured retained at 10 mins in fixed gap hot compression test | Arithmetic mean fibre diameter (µm) | Strength per Cross-Sectional Area (Equation 1) |
|---|---|---|---|
| 1 | 22 | 6.0 | 0.61 |
| 2 | 24 | 5-10 | 0.42* |
| 3 | 25 | 6.3 | 0.63 |
| 4 | 38 | 1.9 | 10.53 |
| 5 | 63 | 5-10 | 1.12* |
| 6 | 32 | 7.3 | 0.60 |
| 7 | 27 | 5-10 | 0.48* |
| 8 | 64 | 5-10 | 1.14* |
| 9 | 42 | 5-10 | 0.75* |
| 10 | 33 | 5-10 | 0.59* |
| 11 | 27 | 9.0 | 0.33 |
| 12 | 37 | 5-10 | 0.66* |
| 13 | 40 | 5-10 | 0.71* |
| 14 | 40 | 5-10 | 0.71* |
| 15 | 111 | 6.7 | 2.5 |
| 16 | 79 | 6.7 | 1.8 |
| 17 | 36 | 4.6 | 1.7 |
| 18 | 53 | 4.6 | 2.5 |
| 19 | 60 | 4.6 | 2.8 |
| 20 | 44 | 4.6 | 2.1 |
| C1 | 0 | 5-10 | 0 |
| C2 | 2 | 2-5 | 0.1* |
| C3 | 12 | 2-5 | 0.98* |
| C4 | 18 | 4.2 | 1.02 |
| C5 | 7 | 2-5 | 0.57* |
| C6 | 0 | <10 | 0 |
| C7 | 0 | 2-5 | 0 |
| C8 | 0 | 2-5 | 0 |
| C9 | 20 | 5-10 | 0.36* |
| C10 | 7 | 5-10 | 0.12* |
| C11 | 0 | 2-5 | 0* |
| C12 | 3 | 5-10 | 0.5* |
| C13 | 8 | 4.2 | 0.45 |
| C14 | 15 | 5-10 | 0.27* |
| C15 | 4 | 5-10 | 0.07* |
| C16 | 8 | 2-5 | 0.14* |
| C17 | 14 | 4.9 | 0.58 |
| C18 | 17 | 18.1 | 0.05 |
| C19 | 2 | 5-10 | 0.04* |
| C20 | 12 | 7.3 | 0.23 |
| C21 | 0 | 5.5 | 0 |
| C22 | 0 | 5.6 | 0 |
| C23 | 0 | 4.0 | 0 |
| C24 | 0 | 3.3 | 0 |
| C25 | 0 | 4.5 | 0 |
| RCF | 36 | 1.65 | 13.22 |
| Isofrax | 0 | 4.0 | 0 |
| SW XT | 0 | 4.0 | 0 |

*estimate using mean diameter of estimated diameter range

Therefore, the inorganic fibres of the present disclosure show improved temperature performance in comparison with compositions of the prior art.

Moreover, the inorganic fibres of the present disclosure are able to produce comparable high performance as well as low biopersistence in comparison with the prior art.

Referring now to Table 6, there is shown data for flow solubility testing.

A 21 day long flow through solubility test in saline pH 4.5 was conducted on the compositions shown in Table 6. Two samples of each fibre composition were simultaneously tested, with the average results reported. The saline samples were analysed using the ICP method to measure the oxide dissolution levels in ppm level. The results confirm that the fibres have low biopersistence. A low biopersistence fibre composition is taken to be a fibre composition which has a dissolution rate, in the flow solubility test, of at least 100 ng/cm² hr or at least 150 ng/cm² hr or at least 170 ng/cm² hr.

TABLE 6

| Example | Specific Surface Area (m²/g) | Dissolution rate (ng/cm²hr) | Fibre Dissolution (% of initial mass) |
|---|---|---|---|
| 1 | 0.443 | 190 | 36.9 |
| C4 | 0.543 | 167 | 40.2 |
| C9 | 0.328 | 214 | 31.8 |

As will be appreciated, the above demonstrates that the fibres of the disclosure have desirable mechanical properties and low biopersistence. This is all the more surprising given that the fibres of the disclosure in mechanical testing were not heat treated and so are amorphous.

Reference throughout this specification to "one embodiment," "certain embodiments," "one or more embodiments" or "an embodiment," whether or not including the term "exemplary" preceding the term "embodiment," means that a particular feature, structure, material, or characteristic described in connection with the embodiment is included in at least one embodiment of the certain exemplary embodiments of the present disclosure. Thus, the appearances of the phrases such as "in one or more embodiments," "in certain embodiments," "in one embodiment" or "in an embodiment" in various places throughout this specification are not necessarily referring to the same embodiment of the certain exemplary embodiments of the present disclosure.

Furthermore, all publications and patents referenced herein are incorporated by reference in their entirety to the same extent as if each individual publication or patent was specifically and individually indicated to be incorporated by reference. Various exemplary embodiments have been described. These and other embodiments are within the scope of the following claims It will be appreciated by those skilled in the art that several variations to the aforementioned embodiments are envisaged without departing from the scope of the disclosure.

It will also be appreciated by those skilled in the art that any number of combinations of the aforementioned features and/or those shown in the appended drawings provide clear advantages over the prior art and are therefore within the scope of the disclosure described herein.

The invention claimed is:

1. A fibre mat for a monolith support mat or end cone insulator, the mat comprising:
   inorganic fibres having a pressure retained value at 10 minutes at 900° C. of greater than 20 kPa; and
   a binder,
   wherein the inorganic fibres comprise X and Y and $K_2O$, the sum of which is greater than 95 wt. % wherein X is the sum of $SiO_2$ and $ZrO_2$ and Y is the sum of $Al_2O_3$ and $La_2O_3$, wherein $ZrO_2$ and $La_2O_3$ each to 10 wt. % of the total weight of the inorganic fibres.

2. The mat according to claim 1, wherein the inorganic fibres are amorphous.

3. The mat according to claim 1, wherein the inorganic fibres have a dissolution rate of at least 150 ng/cm²/hr saline at pH 4.5.

4. The mat according to claim 1, wherein the sum of the wt. % of $SiO_2$ and $Al_2O_3$ and $K_2O$ in the inorganic fibre is greater than 96.0 wt. %.

5. The mat according to claim 1, wherein the sum of the wt. % of CaO and MgO and $Na_2O$ in the inorganic fibre is less than or equal to 0.5 wt %.

6. The mat according to claim 1, wherein the pressure retained value at 10 minutes at 900° C. is greater than 30 kPa.

7. The mat according to claim 1, wherein the arithmetic mean diameter of the inorganic fibres is less than 10 μm.

8. The mat according to claim 1, wherein the retained at 10 minutes at 900° C./(mean diameter of fibre)² is greater than 1.2.

9. The mat according to claim 1, further comprising an inorganic colloidal solution.

10. The mat according to claim 1, further comprising inorganic fillers or additives.

11. The mat according to claim 1, further comprising additional fibres selected from the group consisting of mullite, alumina, aluminosilicate or low biopersistent sol-gel fibres.

12. The mat according to claim 11, wherein the additional fibres are blended with the inorganic fibres.

13. The mat according to claim 11, wherein the additional fibres form a separate layer to the inorganic fibres.

14. A hybrid fibre mat, comprising a first mat according to claim 1, and a second mat formed from different inorganic fibres than the first mat.

15. A pollution control device further comprising a housing and a hybrid fibre according to claim 14 disposed therein, said hybrid fibre mat comprising a hot surface facing a heat source and a cool surface facing an opposing direction to the heat source, wherein the second mat forms part of the hot surface.

16. The pollution control device of claim 15, wherein the first mat forms part of the cool surface.

17. A catalytic converter comprising a housing, a catalytic converter element and, between the housing and the catalytic converter element a mat according to claim 1.

18. A pollution control device comprising a mat according to claim 1.

19. The fibre mat according to claim 1, wherein the inorganic fibres comprise 0 wt % each of $La_2O_3$ and $ZrO_2$.

20. A fibre mat for a monolith support mat or end cone insulator, the mat comprising:
   melt formed amorphous inorganic fibres, with an arithmetic diameter of less than 10 μm; and having a pressure retained value at 10 minutes at 900° C. of greater than 20 kPa; and
   a binder,
   wherein the inorganic fibres comprise X and Y and $K_2O$, the sum of which is greater than 95 wt. % wherein X is the sum of $SiO_2$ and $ZrO_2$ and Y is the sum of $Al_2O_3$ and $La_2O_3$, wherein $ZrO_2$ and $La_2O_3$ each i to 10 wt. % of the total weight of the inorganic fibres.

21. The fibre mat according to claim 20, wherein the inorganic fibres comprise 0 wt % each of $La_2O_3$ and $ZrO_2$.

22. A fibre mat; for a monolith support mat or end cone insulator, the mat comprising:
  inorganic fibres having a strength per cross sectional area of greater than 1.2 kPa/$\mu m^2$; and
  a binder,
wherein the inorganic fibres comprise X and Y and $K_2O$, the sum of which is greater than 95 wt. % wherein X is the sum of $SiO_2$ and $ZrO_2$ and Y is the sum of $Al_2O_3$ and $La_2O_3$, wherein $ZrO_2$ and $La_2O_3$ each to 10 wt. % of the total weight of the inorganic fibres and wherein the fibres have a dissolution rate of at least 150 ng/cm²/hr (saline at pH 4.5).

23. The fibre mat according to claim 22, wherein the inorganic fibres comprise 0 wt % each of $La_2O_3$ and $ZrO_2$.

* * * * *

UNITED STATES PATENT AND TRADEMARK OFFICE
CERTIFICATE OF CORRECTION

PATENT NO. : 10,465,586 B2
APPLICATION NO. : 16/388591
DATED : November 5, 2019
INVENTOR(S) : Gary Jubb et al.

Page 1 of 1

It is certified that error appears in the above-identified patent and that said Letters Patent is hereby corrected as shown below:

In the Claims

In Column 16, Line 2, replace "each to" with "each in the range of 0 wt. % to".

In Column 16, Line 21, replace "the retained" with "the pressure retained".

In Column 16, Line 64, replace "each i to" with "each in the range of 0 wt. % to".

In Column 17, Line 9, replace "each to" with "each in the range of 0 wt. % to".

Signed and Sealed this
Eighteenth Day of February, 2020

Andrei Iancu
*Director of the United States Patent and Trademark Office*